(12) United States Patent
DeMent

(10) Patent No.: US 7,673,760 B2
(45) Date of Patent: Mar. 9, 2010

(54) SUPPORT CRADLE FOR ROLLED COILS AND OTHER CYLINDRICAL OBJECTS

(75) Inventor: R. Bruce DeMent, Lemont, IL (US)

(73) Assignee: Kastalon, Inc., Alsip, IL (US)

( * ) Notice: Subject to any disclaimer, the term of this patent is extended or adjusted under 35 U.S.C. 154(b) by 0 days.

(21) Appl. No.: 12/142,973

(22) Filed: Jun. 20, 2008

(65) Prior Publication Data

US 2008/0272075 A1    Nov. 6, 2008

Related U.S. Application Data

(63) Continuation of application No. 11/208,953, filed on Aug. 22, 2005, now Pat. No. 7,448,505.

(51) Int. Cl.
*A47G 29/00* (2006.01)
(52) U.S. Cl. .................................. 211/59.4; 211/85.22
(58) Field of Classification Search ................... 211/19, 211/59.4, 20, 23, 85.22, 194, 85.18; 108/57.13; 206/446
See application file for complete search history.

(56) References Cited

U.S. PATENT DOCUMENTS

| | | | | |
|---|---|---|---|---|
| 1,739,403 | A * | 12/1929 | Lundberg | 211/85.22 |
| 1,938,126 | A * | 12/1933 | Thompson | 211/85.22 |
| 3,476,260 | A * | 11/1969 | Jay | 206/503 |
| 4,175,666 | A * | 11/1979 | Smith | 211/85.18 |
| 4,412,615 | A * | 11/1983 | Forshee | 206/319 |
| 4,431,107 | A * | 2/1984 | Bergstrom et al. | 211/59.4 |
| 4,503,978 | A * | 3/1985 | Smit et al. | 211/85.5 |
| 4,506,796 | A * | 3/1985 | Thompson | 211/59.4 |
| 5,123,547 | A * | 6/1992 | Koch | 211/59.4 |
| 5,267,648 | A * | 12/1993 | Baker | 206/446 |
| 5,370,245 | A * | 12/1994 | Tersch et al. | 211/74 |
| 5,755,541 | A * | 5/1998 | Suarez | 410/36 |
| 6,065,915 | A * | 5/2000 | Ruehl et al. | 410/36 |
| 6,155,433 | A * | 12/2000 | Anderson et al. | 211/26 |

(Continued)

*Primary Examiner*—Jennifer E. Novosad
(74) *Attorney, Agent, or Firm*—Milton S. Gerstein; Much Shelist

(57) ABSTRACT

A cradle unit for supporting metal coils, and other cylindrical objects, consists of two, parallel and separate saddles preferably made of polyurethane having an approximate hardness range of between 50 Shore A and 90 Shore D, which saddles are connected together via a pair of parallel steel angle-brackets that provide inherent structural integrity to the cradle unit itself, while still allowing the unit to conform to the shape or level of the underlying support structure. The single cradle unit may be as a mobile support-device, or may be bolted or otherwise attached to a surface for a specific location of the stored product. The cradle unit of the invention may, also, be attached to the bed of a transportation vehicle, such as a truck trailer or rail car, in order to provide secure, protective storage and location of the items. In this case, the nature of the resilient or soft material from which the cradle unit is made provides shock-absorption qualities for the transported coil. The cradle unit is generally concave-shaped and has a first main or central lower concave curvature of a first radius, and a middle or secondary transitional curvature that connects the first main lower curvature to an upper, tertiary concave curvature of a second radius greater than the first radius, so that coils or rolls of different diameter may be safely and firmly supported.

3 Claims, 7 Drawing Sheets

U.S. PATENT DOCUMENTS

| | | | |
|---|---|---|---|
| D466,269 S * | 11/2002 | Falland | D34/39 |
| 6,581,785 B1 * | 6/2003 | Falkenstein | 211/24 |
| 7,448,505 B2 * | 11/2008 | DeMent | 211/59.4 |
| 2006/0191858 A1 * | 8/2006 | Posner | 211/20 |

* cited by examiner

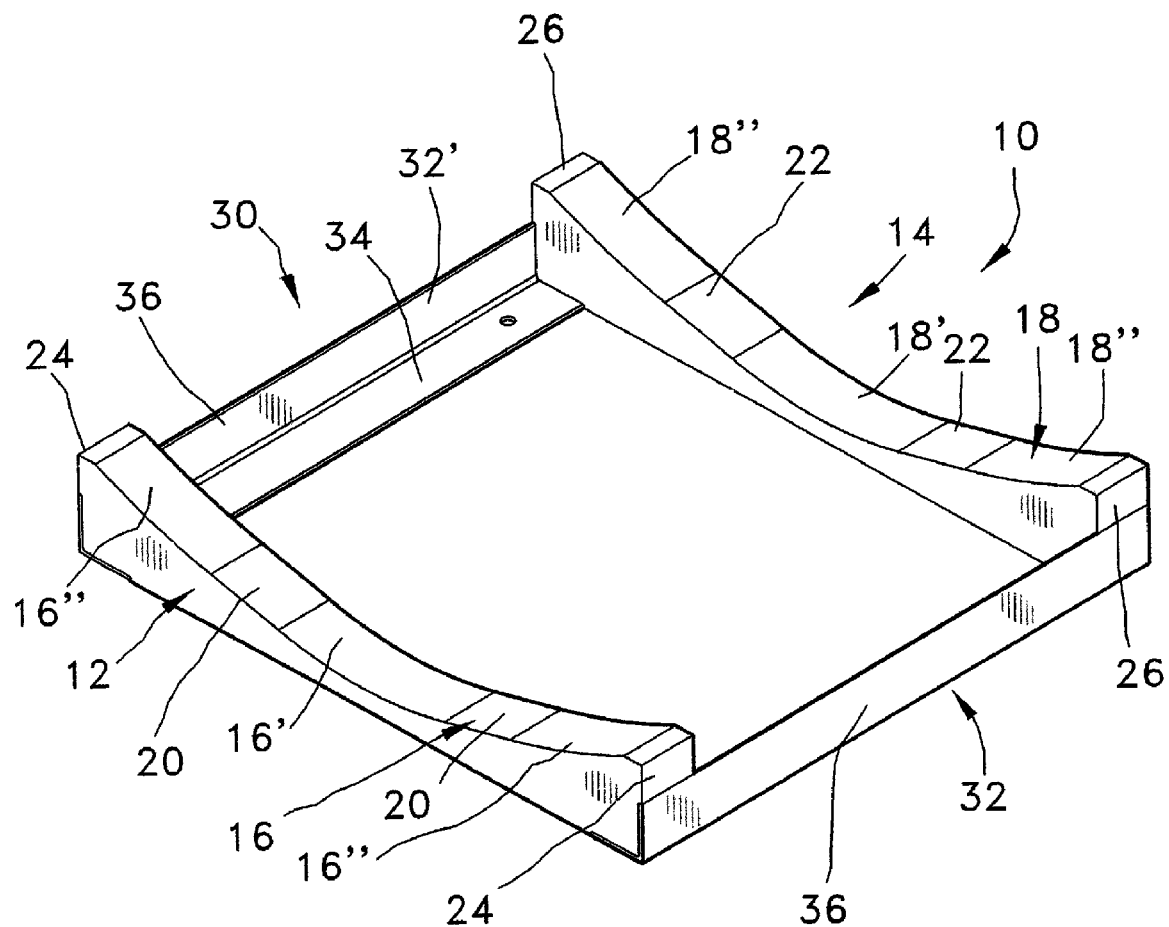

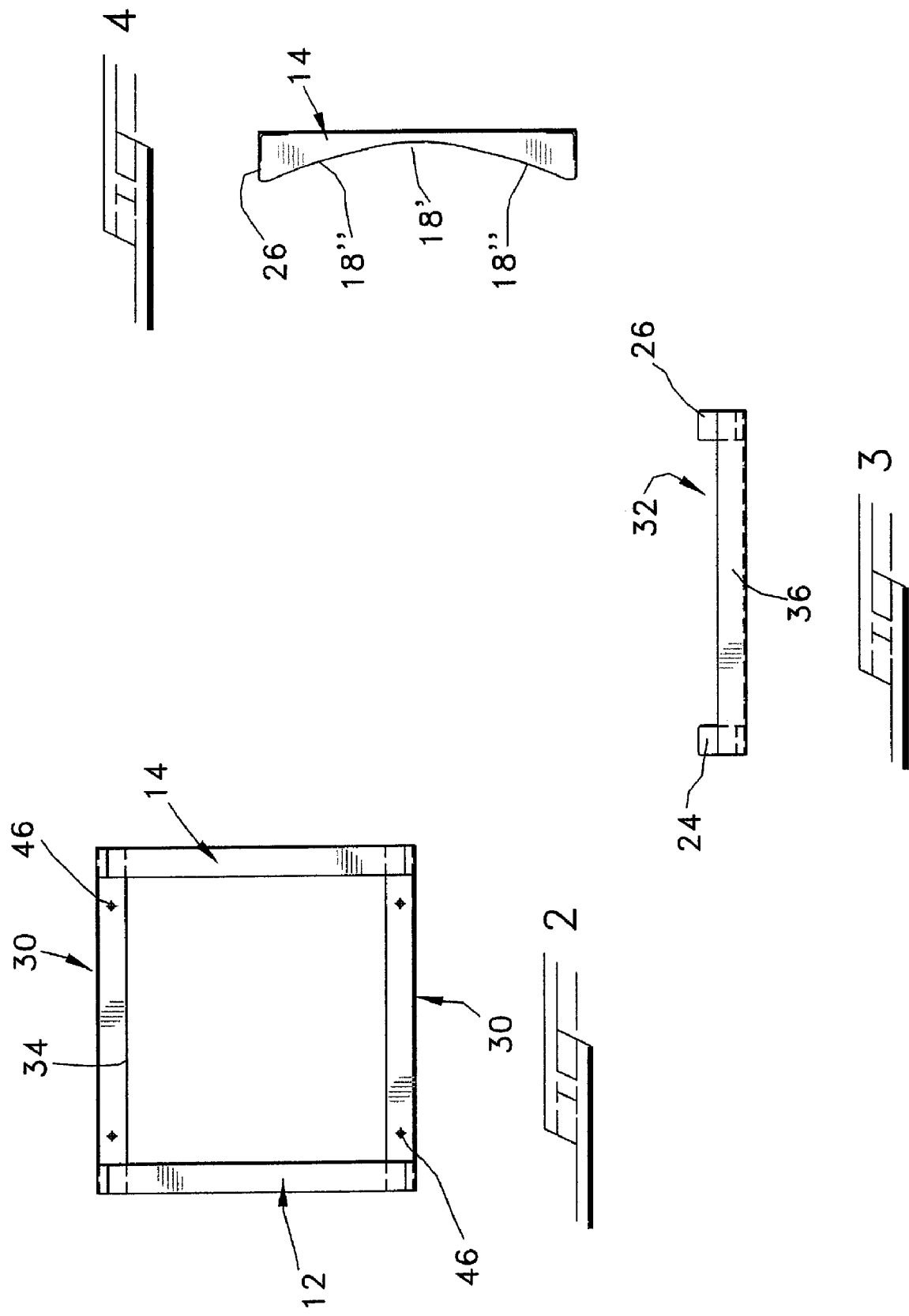

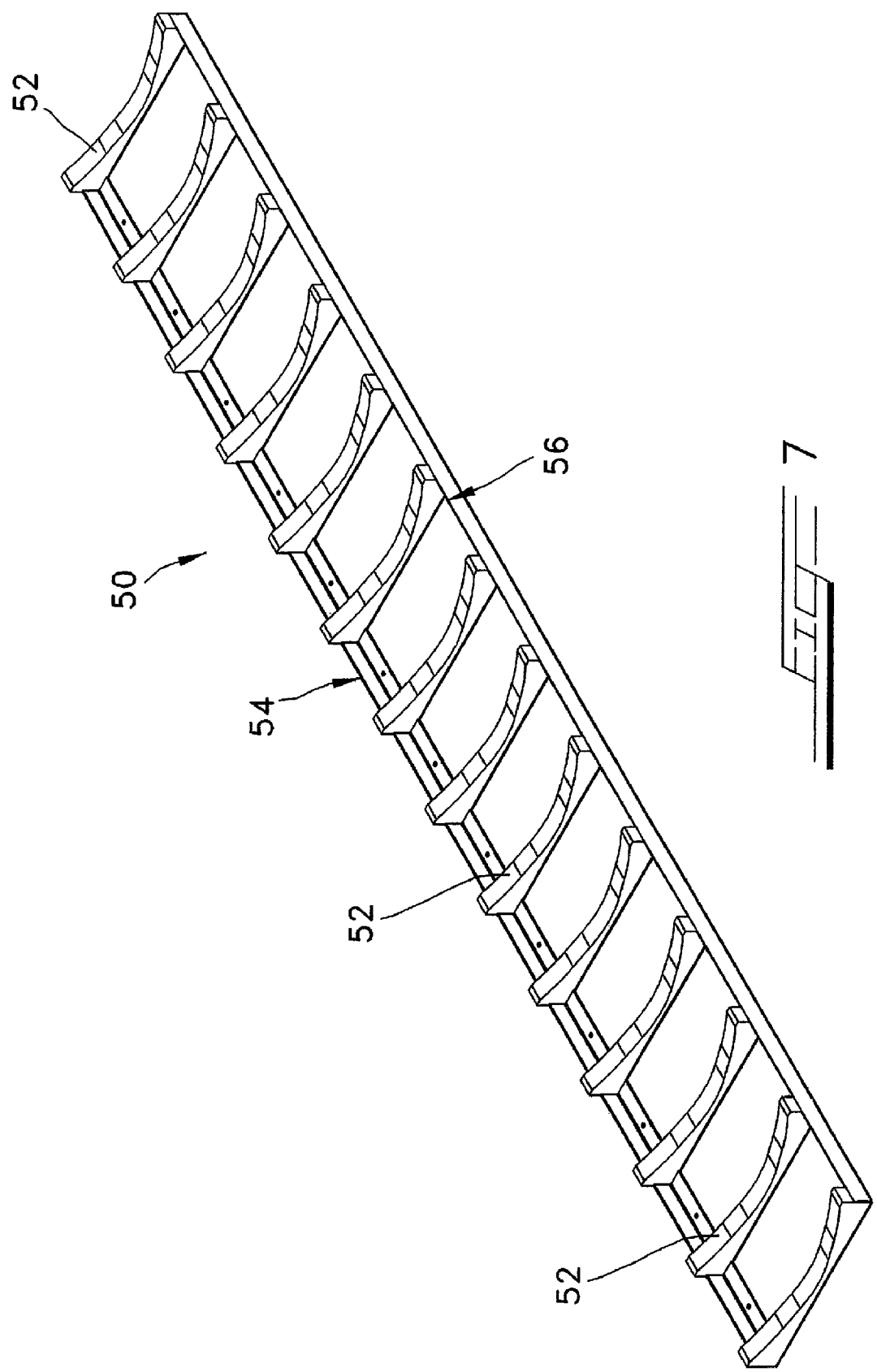

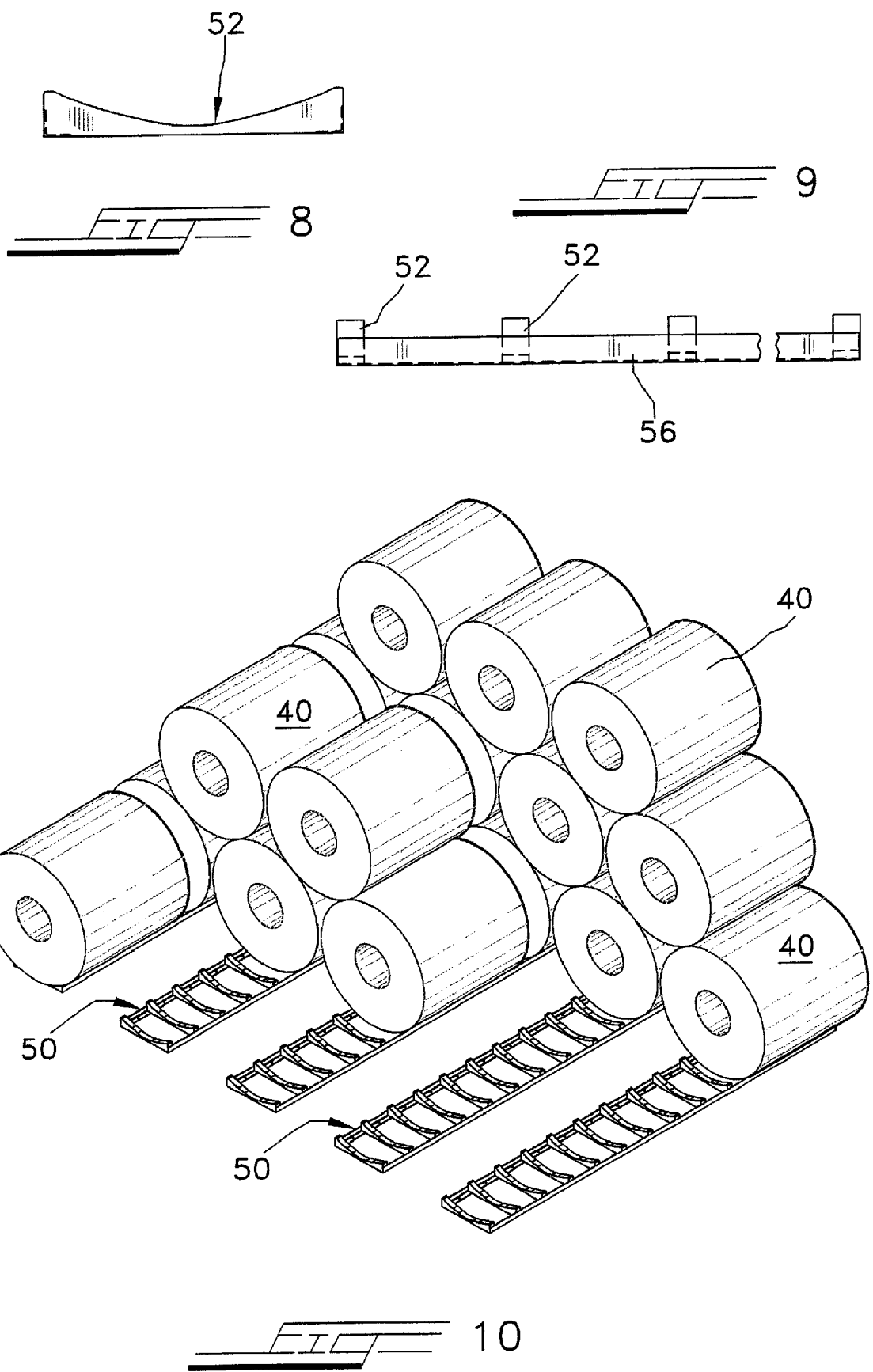

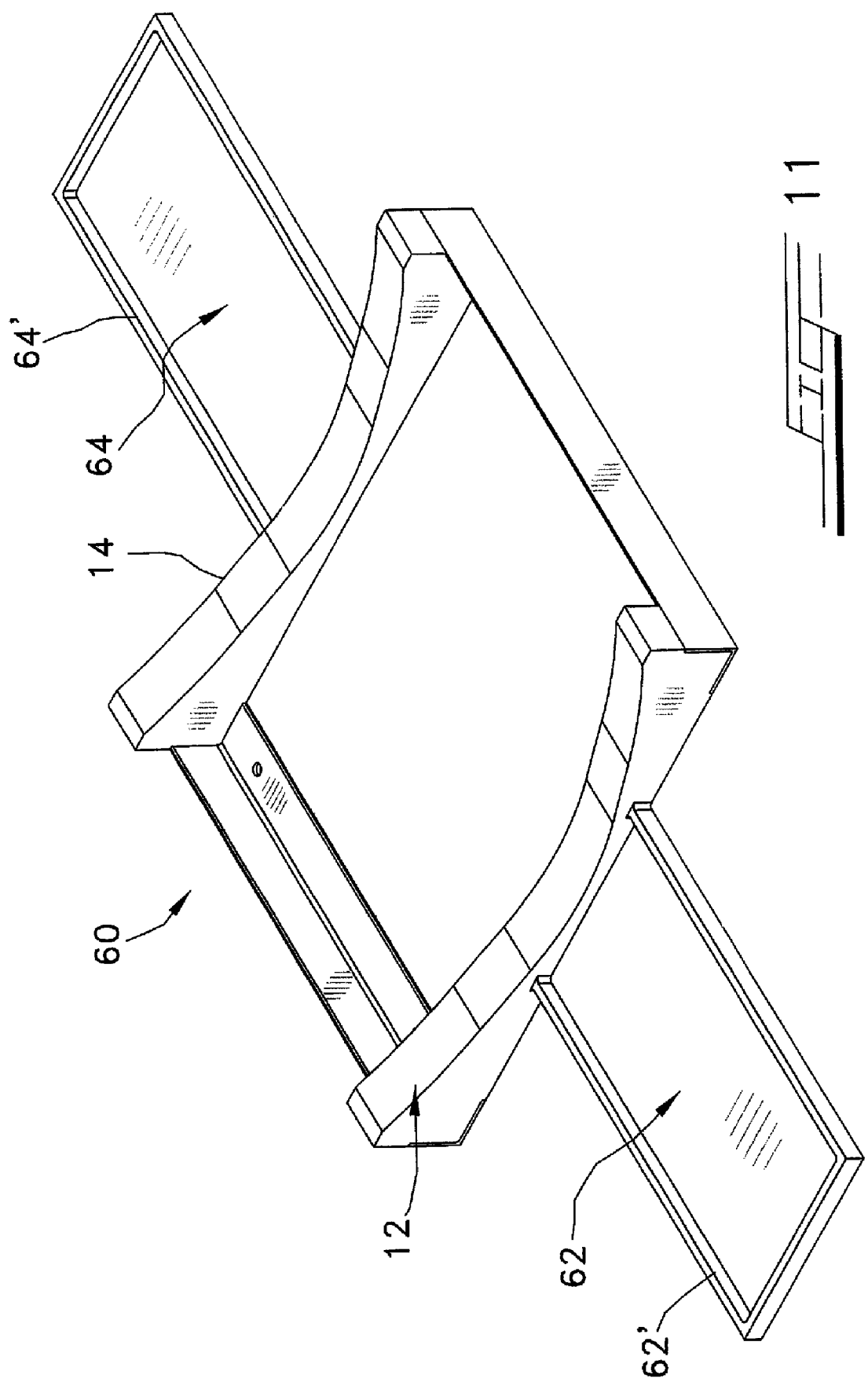

SUPPORT CRADLE FOR ROLLED COILS AND OTHER CYLINDRICAL OBJECTS

CROSS REFERENCE TO RELATED APPLICATION

This is a continuation of application Ser. No. 11/208,953, filed on Aug. 22, 2005, and now U.S. Pat. No. 7,448,505.

BACKGROUND OF THE INVENTION

The present invention is directed to a cradle unit, or supporting member, for supporting and storing coils, such as wound rolls or coils of long lengths of thin flat material made of steel, other metal, paper, or the like, which are processed, handled, stored and transported with the longitudinal axis of the coil oriented in the horizontal direction. When stored in their semi-finished, in-process stage between operations, in their finished state awaiting shipment, or during actual shipment and final storage during actual use, these coils are placed in designated staging areas by supporting them on the floor, since allowing these coils to rest directly on the floor or other flat surface would produce highly-stressed loading at the tangential contact points. Even though these coils may be made of metal, they are relatively soft or pliable, and susceptible to damage from scratching, denting or surface-marking when they impinge upon debris on the floor or on another hard storage surface.

Many locations where coils are stored are on floors that are not flat, tending to misshape or deform the coil over time. Coils may also be damaged from flattening or denting when set down during handling operations, or from excessive pressure or weight while sitting in storage due to single-point tangential and high surface-loading. This situation is exacerbated when coils are stacked during storage, which is common in the metals industries. Therefore, significant expense is incurred from the lost metal and rework of the damaged coils. Additionally, stacked coils, when stored on flat floors, represent a safety hazard from roll out of the bottom tier of the stack. This situation is hazardous to personnel, the facilities and the coils that would be affected by such a collapse of the stack.

There have been used a number of various techniques in an attempt to address the above-mentioned problems. Some of these techniques include: setting coils on rubber or fabric belting; using rubber or polyurethane pads with slight indentations to cradle the coil; using "V"-shaped blocks made of polyurethane, plastic, wood or metal; and unitized skids of plastic, wood or metal, or other similarly constructed devices to contain or protect the coils.

Polyurethane, rubber and plastic coil-support devices possess the ability to cushion the coil during set-down. These devices are typically molded or formed into a single unit, and do not provide suitable strength or structural integrity to support stacks of coils without the use of additional, independent, and separate support structures. Wood supports are not resilient or durable, while metal fabricated supports do not cushion and offer a surface that has is basically the same as a bare floor. Unitized fabrications of wood, plastic or steel are expensive to build, do not offer the durability and protection of a resilient support, and do not conform or adapt to uneven floor conditions.

An example of a prior-art support is disclosed in U.S. Pat. No. 4,503,978—Smit, et al., and discloses a support for rolled coils made of polyethylene. The supports of this patent do not generally provide adequate structural support, and, therefore, are typically supported by U-shaped steel channels bolted to the floor, or other supporting surfaces, and are generally not conformable to a support under-structure.

SUMMARY OF THE INVENTION

It is, therefore, the primary objective of the present invention to provide a support cradle for coils, rolls, or other cylindrical objects that provides its own inherent structural integrity for solely supporting a coil thereon, while also conforming to the under-structure upon which it is rests, which support cradle may be used to support coils or rolls of different diameter.

It is, also, the primary objective of the present invention to provide such a support cradle that provides its own inherent structural integrity for supporting a coil thereon, while also conforming to the under-structure upon which it is secured, which support may also be connected to other like-cradles for forming a multi-unit cradle-support for supporting a series of coils thereon, while still maintaining its conforming characteristics for preventing damage to the coils supported thereon, and for safely stacking of rows of coils thereabove.

In accordance with the invention, the cradle unit for supporting metal coils, and other cylindrical objects, consists of two parallel and separate cradle-sections or saddles made of polyurethane having a hardness range of between 50 Shore A and 90 Shore D, which cradle-sections are joined or connected together via a pair of parallel steel angle-brackets that provide inherent structural integrity to the cradle unit itself, while still allowing the saddles to conform to the shape or level of the underlying support structure, whereby a plurality of cradle units may be used for supporting coils in a tiered stack. The single cradle unit may be used as a mobile support-device, or may be bolted or otherwise attached to a surface for a specific location of the stored product. The cradle unit of the invention may, also, be attached to the bed of a transportation vehicle, such as a truck trailer or rail car, in order to provide secure, protective storage and location of the items. In this case, the nature of the resilient or soft material from which the cradle unit is made provides shock-absorption qualities for the transported coil.

The cradle unit generally defines a concave-shaped upper surface, and has a first main or central lower concave curvature of a first radius, a pair of middle or secondary transitional curvature-sections that connect the first main lower curvature to a pair of upper, tertiary concave curvature-sections of a second radius greater than the first radius, so that coils or rolls of different diameter may be safely and firmly accommodated.

In a modification of the invention, a multiple-unit version is provided where a series of cradle units of the invention are connected together to form one elongated integral support structural unit. This modification is a unitized rack that forms a row-storage arrangement where the stored coils or objects are stored randomly along the length of the rack, for securing and protecting the stored coils or objects, with the coils arranged lengthwise along the length of the rack.

In yet another modification, each cradle unit is provided with outwardly-projecting oil-receiving pans or reservoirs for collecting oil or other liquid lubricant seeping or draining out from the ends of the coil supported thereby. These pans provide for the containment of the fluid to prevent contamination of the surrounding environment, and provide for safe, easy recovery and disposal of the liquid.

BRIEF DESCRIPTION OF THE DRAWINGS

The invention will be more readily understood with reference to the accompanying drawings, wherein:

FIG. 1 is an isometric view of the cradle unit for supporting a coil, roll, or other cylindrical object in accordance with the invention;

FIG. 2 is a top view thereof;

FIG. 3 is a side, elevational view thereof;

FIG. 4 is an end view thereof;

FIG. 7 is an isometric view of a modification in which a series of cradle units of FIG. 1 are provided in one unitary structure for forming a rack for supporting a series of coils, rolls, or other cylindrical objects in a row;

FIG. 8 is an end view thereof;

FIG. 9 is a side elevational view thereof;

FIG. 10 is an isometric view showing a series of cradle racks of FIG. 7 being used to support a plurality of stacked rows of coils or rolls;

FIG. 11 is an isometric view of another modification of the cradle unit of FIG. 1 with the addition of a pair of end-pans serving as reservoirs for collecting lubricant draining from coils or rolls supported or stacked thereon;

DETAILED DESCRIPTION OF THE INVENTION

Figure 5:
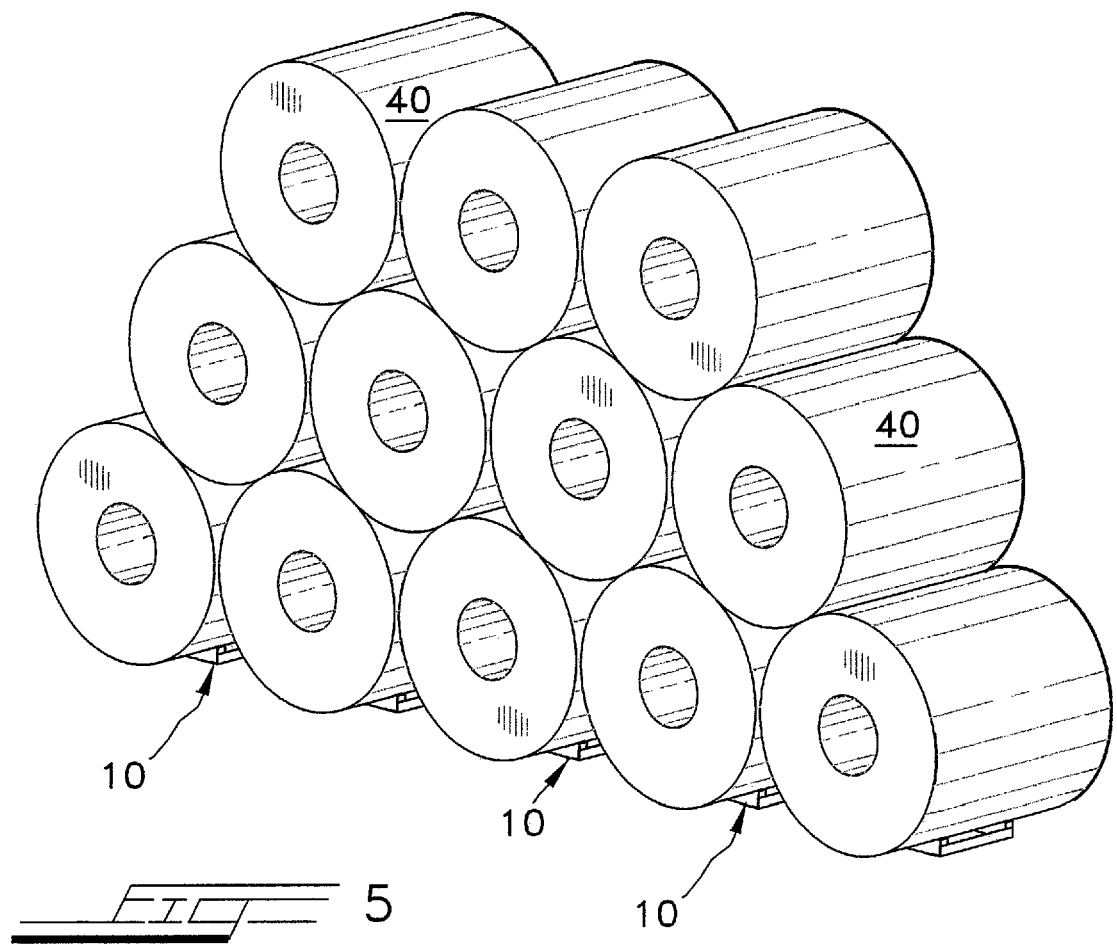
FIG. 5 is an isometric view showing a series of cradle units of FIG. 1 being used to support a tiered stack of coils or rolls.

Referring now to the drawings in greater detail, and to FIGS. 1-6 for now, there is shown a cradle unit 10 of the invention for supporting a coil, roll, or other large cylindrical object. The cradle unit 10 consists of a pair of parallel-arranged, identical end-cradle sections or saddles 12, 14 preferably made of polyurethane, in the hardness range of between 50 Shore A and 90 Shore D. The length of each end-cradle section or saddle element 12, 14 depends upon the size or sizes of the coils or rolls to be supported. In one example, each end-cradle section is thirty three inches in length and three inches in width. Each end-cradle section or saddle element 12, 14 defines an upwardly-facing concave supporting surface 16, 18 which consists of a first lower or main portion 16', 18', respectively, having a first radius R1, and second upper or tertiary end portions 16", 18" each having a second radius R2 that is greater than the radius R1. Connecting the surface-portion 16' or 18' with the portions 16" or 18" are transitional curvature-portions or regions 20, 22, respectively. The values of R1 and R2 will vary depending upon the size of coils or rolls to be supported. The value R1 corresponds to the radius of the minimal coil or roll to be supported by the cradle 10, while the value R2 corresponds to the radius of the maximal coil or roll to be supported by the cradle 10. In the example given above, the first radius R1 is twenty inches, while the second radius R2 is thirty six inches, with the height of each end-cradle section or saddle increasing from a minimum of one inch at the midpoint or center to a maximum of five inches at the extremity or end 24, 26. Each of the ends 24, 26 defines a vertical surface-face. Each saddle 12 and 14 also defines a flat bottom surface.

With regard to the transitional regions 20, 22, it is noted that the first lower or main portion 16', 18' and the second upper or tertiary end portions 16", 18" not only have different radii R1 and R2, but, of course, also have different points of centers pt1 and pt2, respectively. The shape or curvature of each transition region 20, 22 is formed by generating a number of circles of different radii and from a varying center position pt[i] between the center points pt1 and pt2 in a linear relationship. Using the equation: pt[i]=pt1+(pt2−pt1)/(r2−r1)*abs(r1−r[i]), where pt[i] is a center point of a transitional circle and r[i] is the radius of the transitional circle, connecting the tangents of these generated circles form the curve of each transition region 20, 22.

The cradle unit 10 also includes a pair of parallel-arranged steel right angle-brackets 30, 32 which provide the inherent structural integrity to the unit. Each angle-bracket connects corresponding ends 24, 26 of the two end-cradle sections 12, 14, as seen in FIG. 1. Each angle-bracket 30, 32 consists of a horizontal section 34 and a vertical section 36, with a respective end of a cradle unit being nestled therein. Each respective vertical section 36 of the right-angle brackets is in flush engagement with and bonded to a vertical surface-face of the ends 24, 26 of the end-cradle sections by conventional bonding techniques, while each respective horizontal section 34 is in flush engagement with and bonded to a respective bottom surface of the end-cradle sections at the ends 24, 26 thereof, whereby a flexible and adaptable rectilinear-shaped structure is formed. In the above-mentioned example, the length of each angle-bracket is thirty six inches, with the width of each of the horizontal and vertical sections being three inches, and made of 3/16 steel. Each horizontal section 34 is provided with a pair of holes 46 for passing therethrough bolts for securing the cradle unit 10 to a floor or other understructure.

Figure 6:
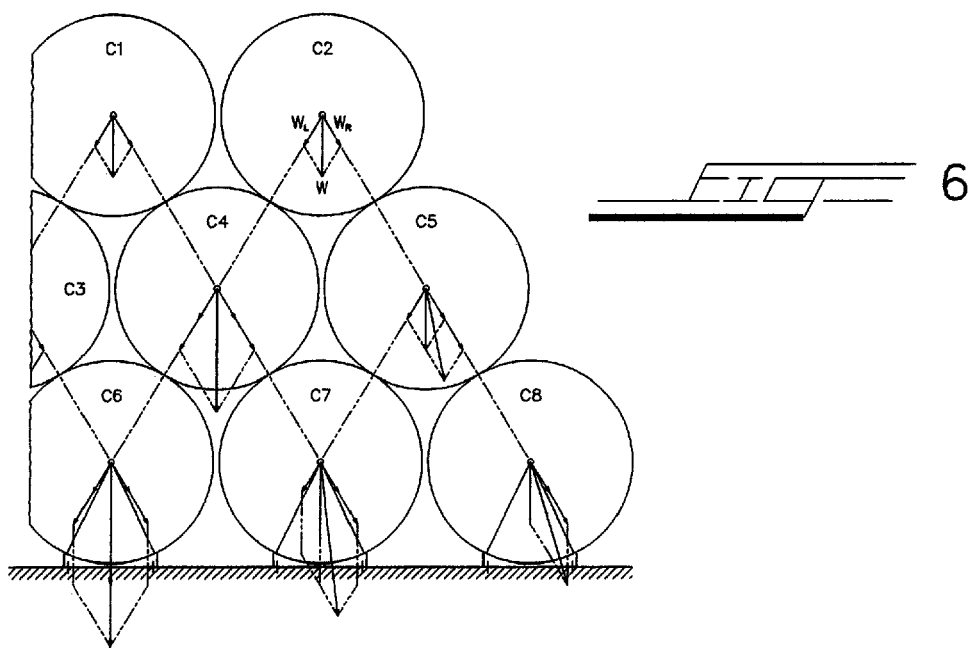
FIG. 6 is an isometric view similar to FIG. 5 showing the force vectors acting on the coils or rolls and on the series of cradle units supporting the stack of coils or rolls.
Figure 12:
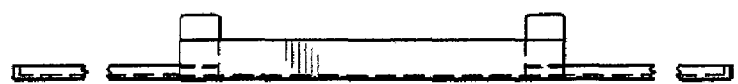
FIG. 12 is a side elevational view thereof.
Figure 13:
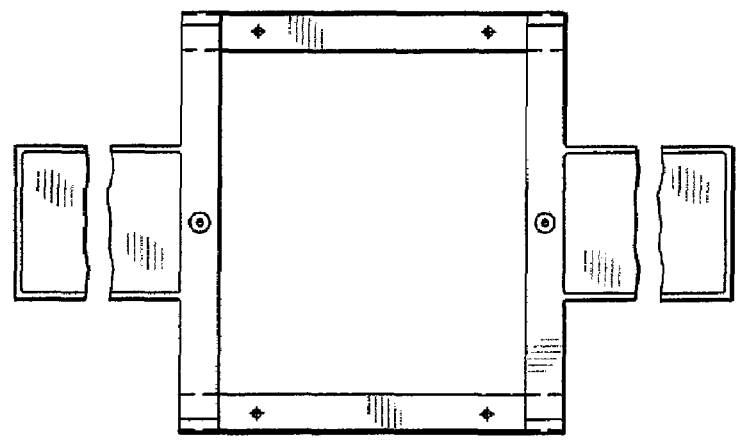
FIG. 13 is a top view thereof.
Figure 14:
FIG. 14 is an end view thereof.

Referring to FIGS. 5 and 6, it may be seen how a series of cradle units 10 may be used to support a tiered vertical stack of rows of coils or rolls 40. The force vector diagram depicts coils C1 through C8 stacked on the coil cradle units 10 of the invention. The loads are calculated as if the stack continues on to the left of the diagram. Each coil shown has been assumed to be of a 72" O.D. and a weight W. Because of the stacking, the downward force W splits into the two vector forces $W_L$ and $W_R$. For purposes of clarity, only coil C2 has been shown with the forces labeled. On the middle row, the forces acting on coil C4 are its weight W plus $W_R$ from coil C1 and $W_L$ from coil C2. The resultant force, 2·W, is drawn using vector addition. The forces acting on coil C5 are its weight W plus $W_R$ from coil C2. The resultant force is drawn using vector addition. On the bottom row, the forces acting on coil C6 are its weight W plus 2·$W_R$ from coil C3 and 2·$W_L$ from coil C4. The resultant force, 3·W, is drawn using vector addition. The forces acting on coil C7 are its weight W plus 2·$W_R$ from coil C4 and $W_L$ from coil C5. The resultant force is drawn using vector addition. The forces acting on coil C8 are its weight W plus 2·$W_R$ from coil. The resultant force is drawn using vector addition. On the bottom row, lines are drawn from the center of the coils to the edges of the ends 24, 26 of the cradle units. If the resultant force vectors remain in between these lines, the stack will be stable, assuming that the coils in the stack are frictionless and not considering inertia. In actual use, the stack could be stable even if this limit were somewhat exceeded. Because of the provision of two separate upper curved sections of different radii R1 and R2 for each cradle unit, multiple layers of coils of different diameter may be more safely stacked, as shown in FIGS. 5 and 6.

Referring now to FIGS. 7-10, there is a shown a modification in which a series of cradle units 10 are provided to form a rack 50 of cradles for supporting a plurality of individual coils thereon end-to-end to form a ladder-like structure. The rack 50 consists of a plurality of cradle elements 52 similar to the end-cradle sections 12, 14 of the cradle unit 10, which cradle sections 52 are interconnected together by a pair of elongated steel angle-brackets 54, 56 similar to the angle-brackets 30, 32 of the cradle unit 10 of FIG. 1. The spacing between the cradle elements 52 is generally less than the spacing between the end-cradle sections or saddles 12, 14 of the cradle unit 10. Whereas the spacing between the cradle sections 12, 14 in one example cited above is thirty inches, the spacing between adjacent cradle elements 52 is 15¼ inches, so that, not only variously-sized rolls or coils of different diameters may be supported and stored on the rack 50, but also coils or rolls of different lengths may be supported thereby. In addition, owing to the series arrangement of cradle sections 52, the placing of a coil or roll on the rack 50 may be achieved at any portion along the length thereof thereby allowing facility of placement and storage. A plurality of racks 50 may be employed in parallel formation, as shown in FIG. 10, in order to allow for support and storage of multiple, stacked rows of coils or rolls 40. The spacing between racks 50 is dependent upon the size of the coils or rolls 40 to be supported. Each individual rack 50 is bolted to the floor or under-structure by bolts passing through the angle-brackets, in the same manner described above with reference to the cradle unit 10. In addition, oil pans similar to oil pans described hereinbelow with reference to FIGS. 11-14, may also be used for collecting oil, or other fluid. It is noted that the individual rolls or coils are supported end-to-end, with their longitudinal axes being parallel to the length of the rack, whereby the rack 50 supports them in the manner that has hithertofore only been done using a coil pad. Thus, the rack 50 serves the dual function of acting as cradle supports and as a coil pad.

Referring now to FIGS. 11-14, there is shown another modification 60 of the cradle unit 10 in which a pair of oil-collecting pans or reservoirs 62, 64 are provided at the ends of the cradle unit in order to collect oil or other lubricant or fluid seeping or draining out from the ends of the coil supported thereby. These pans provide for the containment of the fluid to prevent contamination of the surrounding environment, and provide for safe, easy recovery and disposal of the liquid. Each oil-collection pan 62, 64 is preferably formed integrally with the respective cradle section 12, 14, and typically has a width of twelve inches and a length of two feet. Each pan 62, 64 is provided with an upstanding lip or rim 62', 64' for containing the oil. The rest of the cradle unit 60 is substantially identical to the cradle unit 10.

The cradle of the invention adapts readily and inherently to the contour of the underlying support structure or floor, with the spacing between the angle-brackets and between the saddles providing a self-adapting unitary structure, so that uneven or contoured floors will not adversely affect the support provided by the cradle of the invention. Moreover, the inherent resiliency of the material used in the saddles offer shock-absorption characteristics.

While the preferred material for the saddles has been indicated as being polyurethane, other, comparable or equivalent material may be used instead, or composites thereof. Some of these other materials are, for example: nylon; nyrim; polyethylene of all molecular weights (ultra high, high density, medium density, low density, copolymers, homopolymers); rubber such as SBR, EPDM, nitrile, Neoprene (polychloroprene), natural, Hypalon (chlorosulfonated polyethylene rubber), butyl; granulated and rebonded rubber; and recycled plastics; recycled plastic/wood flour or other similarly formulated blends; polypropylene; vinyl (PVC). It is also within the scope and purview of the invention to use materials having a Shore A through Shore D hardness different from that mentioned hereinabove, as long as structural integrity is imparted to the saddle elements.

While specific dimensions have been given hereinabove, it is to be understood that these have been given only by way of example. The actual dimensions may vary depending upon the lengths and diameters of the coils or rolls intended to be supported.

While the transition regions 20, 22 have been described as having shape or contour described hereinabove, it is to be understood that other methods for producing the shape or contour thereof may employed, as well other different shapes and curvature.

While a specific embodiment of the invention has been shown and described, it is to be understood that numerous changes and modifications may be made therein without departing from the scope and spirit of the invention as set forth in the appended claims.

What is claimed is:

1. A support cradle for use in supporting a coil, roll, or other cylindrical object, comprising:
   a pair of parallel saddle elements;
   each said saddle element comprising a roll-supporting, substantially concave upper support-surface upon which may rest a portion of a coil or roll, a bottom surface, and a first end and a second end, each of said first and second ends having a vertical surface-face;
   each said saddle element being made of nonmetallic, substantially inherently-resilient material;
   a pair of parallel connecting elements arranged perpendicularly to said pair of saddle elements, each said connecting element comprising a first end and a second end and connecting corresponding ones of said first and second ends of the said pair of saddle elements in order to form a rectilinear-shaped structure;
   each said connecting element being made substantially of metallic material;
   each of said pair of parallel connecting elements comprises a one-piece, integrally-formed, right angle-bracket consisting of a vertical section and a horizontal section defining a nestling portion defined by the junction of said vertical and horizontal sections;
   a respective said corresponding end of each of said pair of parallel saddle elements being nestled in a respective said nestling portion and affixed thereto, a respective said first end of one of said connecting elements being affixed to a said first end of one of said pair of saddle elements and a respective said second end of said one connecting element being affixed to a said first end of the other of said pair of saddle elements;
   a respective said first end of the other of said connecting elements being affixed to a said second end of the one of said pair of saddle elements and a respective said second end of said other connecting element being affixed to a said second end of the other of said pair of saddle elements;
   each respective said end of a said connecting element having an end of the respective said horizontal section thereof in flush contact-engagement with and affixed to a portion of a respective said bottom surface of a said end of a respective said saddle element, and having an end of the respective said vertical section thereof in flush contact-engagement with and affixed to a portion of a respective said vertical surface-face of a said end of a respective said saddle element.

2. The support cradle for use in supporting a coil, roll, or other cylindrical object according claim 1, wherein said non-metallic material is chosen from at least one of the group consisting of: polyurethane, nylon, nyrim, polyethylene, rubber, polychloroprene, natural, chlorosulfonated polyethylene rubber, butyl, plastic/wood flour, polypropylene, PVC, and other plastics.

3. The support cradle for use in supporting a coil, roll, or other cylindrical object according claim 2, wherein said metallic material of which said connecting elements are made is steel.

* * * * *